United States Patent [19]

Eve

[11] Patent Number: 5,117,854
[45] Date of Patent: Jun. 2, 1992

[54] STOPCOCK HOLDER

[75] Inventor: Christopher F. Eve, Washington, D.C.

[73] Assignee: The United States of America as represented by the Department of Health and Human Services, Washington, D.C.

[21] Appl. No.: 749,240

[22] Filed: Aug. 23, 1991

[51] Int. Cl.⁵ .............................................. F16K 43/00
[52] U.S. Cl. ........................................ 137/15; 137/315; 248/154; 248/313; 248/507
[58] Field of Search ................. 137/15, 315, 377, 381, 137/382; 248/154, 313, 507, 508

[56] References Cited

U.S. PATENT DOCUMENTS

| | | | |
|---|---|---|---|
| 961,959 | 6/1910 | Herfurth | 137/382 |
| 1,158,631 | 11/1915 | Caldwell | 137/382 |
| 1,652,916 | 12/1927 | Trottier | 137/382 |
| 1,659,843 | 2/1928 | Trottier | 137/382 |
| 1,903,581 | 4/1933 | Turner | 137/382 |
| 2,454,018 | 11/1948 | Wagstaff | 248/507 |
| 4,422,314 | 12/1983 | Cooper | 137/382 |
| 4,807,660 | 2/1989 | Aslanian | 137/382 |
| 4,903,719 | 2/1990 | Rains | 137/382 |

*Primary Examiner*—George L. Walton
*Attorney, Agent, or Firm*—Lowe, Price, Leblanc & Becker

[57] ABSTRACT

A valve holder and a method of use thereof enables convenient securing and releasing of a valve, such as a stopcock valve. The valve holder allows an operator to operate a valve utilizing one hand. The valve holder includes a support block and a chamber fixed to the support block. In operation, the chamber receives a valve to be secured by the valve holder and a clamp member is tightened to the support block to thereby secure the valve in the chamber. A hand operated mechanical fastener such as a thumb screw is utilized to tighten the clamp member to the support block. Cooperating recesses in the chamber and clamp member secure the valve in the holder and prevent movement of the valve within the holder.

16 Claims, 4 Drawing Sheets

STOPCOCK HOLDER

TECHNICAL FIELD

The present invention relates to holders for securing laboratory equipment and more particularly to holders for securing valves, including stopcocks.

BACKGROUND ART

As is common, various laboratory procedures require numerous pieces of equipment which are interconnected to serve one or more functions or to provide one or more procedure steps. Often, various tubular fluid flow connections are also required to supply fluids such as liquids or gases, or transfer or remove fluids from various stations in a laboratory equipment set-up. In addition, such tubular flow connections, e.g., tubes, hoses, etc., may also be utilized to supply vacuums and/or pressures to various stations in a laboratory equipment set-up.

Frequently, laboratory equipment set-ups are modified or assembled in a piece-by-piece fashion with various stations supported by an assortment of stands, e.g., ring stands and other support structures. Tubular fluid connections are lastly added to supported equipment utilizing any convenient pathway. Often, especially when utilizing flexible hoses to tubes, the tubular flow connections are not supported between their connected ends. When it is necessary to incorporate valves in such unsupported tubular flow connections it becomes a problem to operate the valves, especially when conducting procedures which preoccupy one of the operator's hands.

In order to allow an operator to operate a valve, e.g., stopcock valve, utilizing one hand, it has been known to secure such valves by mechanical fastening means. Heretofore, it has been known to utilize pipe clamps to secure and support such valves. A disadvantage in utilizing pipe clamps is that pipe clamps are generally attached to a support by means of screws or bolts and therefore do not allow for easily securing and removing valves.

The present invention provides for a convenient means to easily secure and remove valves in laboratory equipment set-ups.

DISCLOSURE OF THE INVENTION

It is accordingly one object of the present invention to provide a means for securing and supporting a valve means.

Another object of the present invention is to provide a means for easily and conveniently securing and supporting a valve means.

A further object of the present invention is to provide a valve support which allows one-handed operation of a valve secured therein.

A still further object of the present invention is to provide a means to support and secure a valve which is easily operated.

A still further object of the present invention is to provide for a method of securing and supporting a valve means.

According to these and further objects of the present invention which will become apparent as the description thereof is presented hereafter, the present invention provides for a valve holder comprising a support block, a chamber for receiving a valve to be secured by the valve holder, the chamber being fixed to the support block, and a clamp member for securing the valve in the chamber.

The present invention further provides for a method of securing a valve comprising providing a support block having a chamber attached thereto for receiving a valve to be secured, positioning a valve to be secured in the chamber so that a portion of the valve rests on an upper portion of the chamber, and securing the valve in the chamber by tightening a clamp member to the support block.

BRIEF DESCRIPTION OF DRAWINGS

Features and characteristics of the present invention will be described below with reference to the attached drawings which are given by way of non-limiting examples only, in which.

BEST MODE FOR CARRYING OUT THE INVENTION

The present invention relates to a holder for a valve which includes a base configured to receive and support the valve and a clamp member which can be secured to the base so as to clamp and secure the valve into the base.

The valve holder of the present invention is particularly designed to support and secure conventional stopcock valves. However, from the overall design of the valve holders of the present invention it is to be understood that the holders can readily be adapted for use in conjunction with different types of valves, including rotary valves, slide valves, valves which are operated by pushing or pulling operations, etc.

The valve holder of the present invention can be used in conjunction with two-way and other multiport valves, including stop valves, metering valves, flow-control valves, and the like.

The valve holder can be mounted on any flat surface such as a table or bench top or a wall. In further embodiments, the base may include suitable brackets or mechanical devices such as a suction cup(s) by which to secure the base to various structures including conventional laboratory stands or racks.

Figure 1:
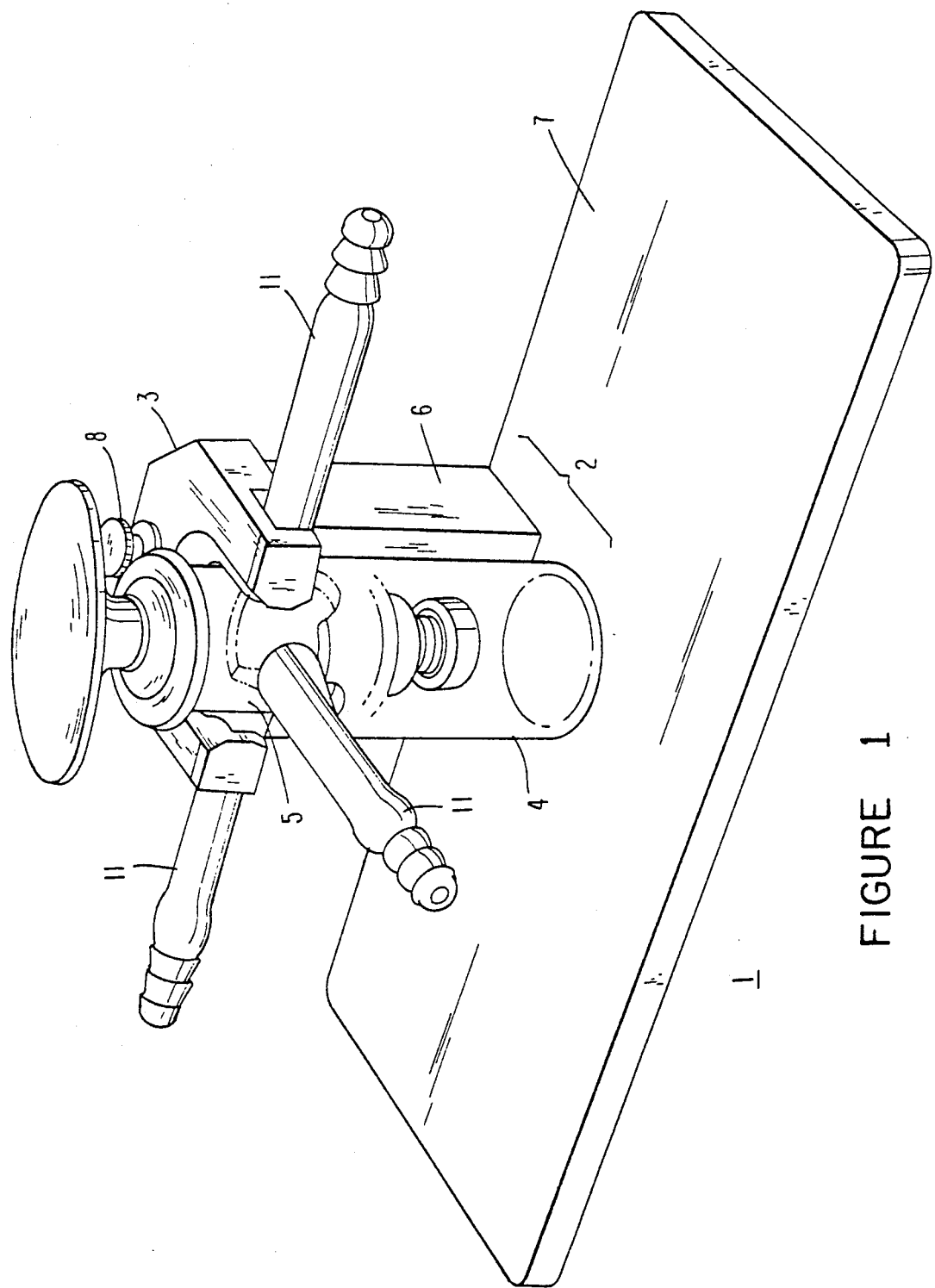
FIG. 1 is a perspective view of a valve holder according to one embodiment of the present invention with a valve secured therein.

FIG. 1 is a perspective view of a valve holder 1 according to one embodiment of the present invention with a valve secured therein. As depicted in FIG. 1, the valve holder 1 includes a base 2 and a clamp member 3. The base includes a chamber 4 which receives a valve body 5 as shown in FIG. 1. Chamber 4 is connected to a support block 6 which can be fastened to a base plate 7 or any suitably stable object such as a table or bench top or a wall. In further embodiments, the support block 6 can include suitable brackets or mechanical devices for fastening the base 2 to various structures including conventional laboratory stands or racks.

As depicted in FIG. 1, the clamp member 3 is releasibly attachable to the top portion of the support block 6 by means of a suitable mechanical fastener, e.g., a thumb screw 8. In alternative embodiments, the clamp member 3 is attached to the support block 6 by other easily fastening means such as a wing nut, mechanical clip, or other equivalent means. When utilizing a thumb screw 8 as show in FIG. 1, the support block 6 is provided with a suitable threaded bore 9 (FIG. 2) which is aligned to receive the thumb screw 8. According to the present invention it is desirable to include a fastening means, i.e., thumb screw, which allows easy, releasable attachment of the clamp member 3 to the support block 6.

Figure 2:
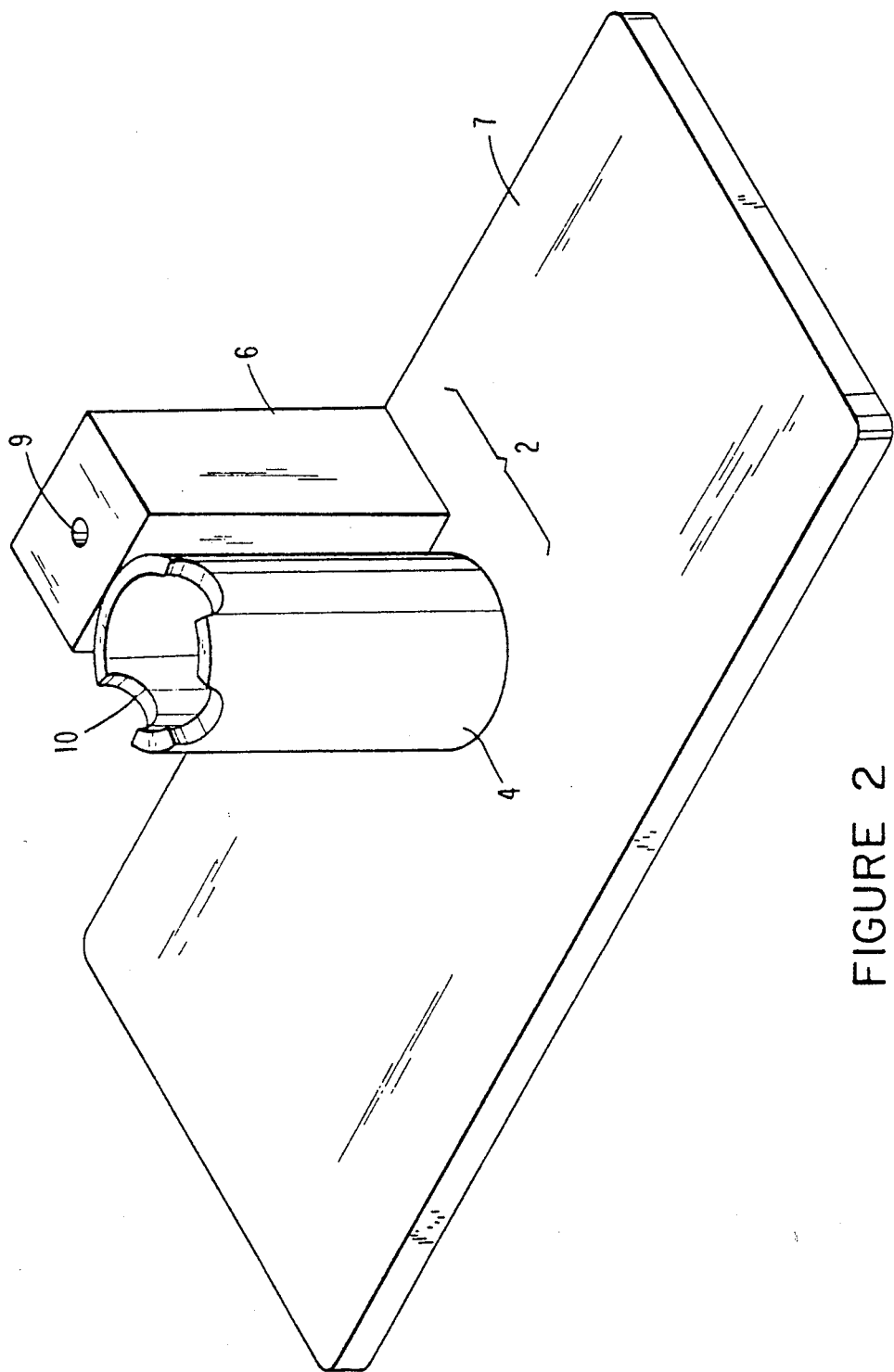
FIG. 2 is a perspective view of a base of a valve holder according to one embodiment of the present invention.

FIG. 2 is a perspective view of a base of a valve holder according to one embodiment of the present invention. As depicted in FIG. 2, the chamber 4 may comprise a generally cylindrical structure which is fixed to the support block 6. In use, the volume in the center of the chamber 4 receives a valve body 5 (FIG. 1) and supports the valve body 5 by a number of recesses 10 which are formed in an upper portion of the wall of the chamber 4, as best shown in FIG. 1. That is, the recesses 10 are suitably spaced apart along the upper portion of the wall of the chamber 4 so that, when the valve body 5 is inserted into the chamber 4, portions of the valve which extend outward from the valve body 5, e.g., ports 11, are received in and supported by the recesses 10.

As depicted in FIG. 2 the chamber 4 is defined by a cylindrical structure having a circular cross-sectional shape. Nevertheless, the cross sectional shape of the chamber 4 is not limited to a circular shape, but could be oval shaped, square, triangular, or be of any suitable shape capable of receiving the valve body 5.

Figure 5:
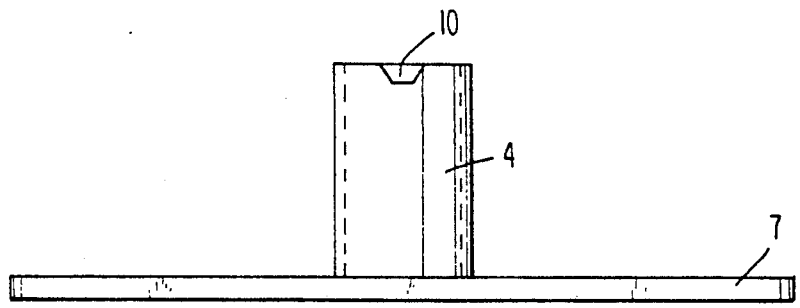
FIG. 5 is a side view of a base of a valve holder according to another embodiment of the present invention.

As further depicted in FIG. 2, the recesses 10 are shown to be semicircular. However, as shown in FIG. 5, the recesses could have a trapezoid shape, i.e., a isosceles trapezoid shape, or otherwise be triangular, rectangular, square, parabola shaped, or be of any other suitable shape capable of receiving portions of the valve which extend outward from the valve body 5. It is noted that ideally, the shape of the recesses should be selected so as to stabilize the valve body 5 once the valve body 5 is received in the chamber 4 and secured by the clamp member 3 as discussed below. Thus, it has been determined during the course of the present invention that the use of a trapezoid shaped recess (FIG. 5) is preferred for purposes of the present invention, inasmuch as a trapezoid shaped recess prevents shifting of the valve body 5 by allowing the portions of the valve which extend outward from the valve body 5 to remain in contact with the walls of the recess so as to prevent lateral shifting thereof.

Figure 3:
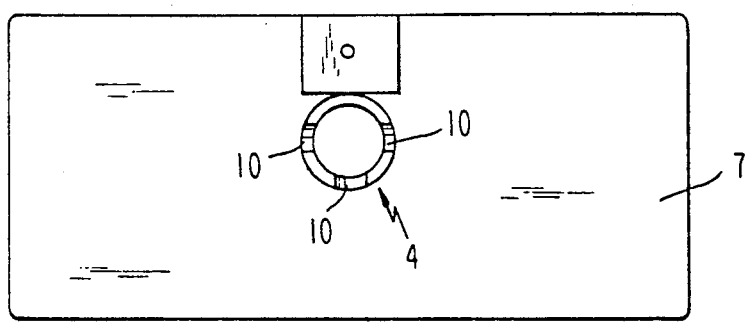
FIG. 3 is a top view of a base of a valve holder according to one embodiment of the present invention.

FIG. 3 is a top view of a base of a valve holder according to one embodiment of the present invention. In FIG. 3, three recesses 10 are shown which are suitable positioned to receive the three ports 11 of the valve body 5 shown in FIG. 1. It is to be noted that the alignment of the recesses shown in FIG. 3 could also be used in conjunction with a valve having only two ports which are aligned along a common axis, such as a stop valve. Alternatively, only two diametrically opposed recesses could be incorporated for securing such a two port valve. Thus, the number of recesses could in fact be greater than the number of valve ports so long as a like number of recesses are properly aligned to receive each of the ports of a valve.

Figure 4:
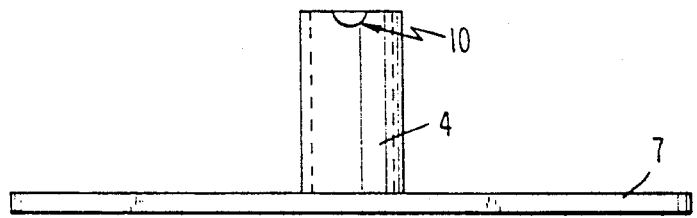
FIG. 4 is a side view of the base of FIG. 3.

FIG. 4 is a side view of the base of FIG. 3. FIG. 4 is presented to illustrate a suitable circular shape for the recesses 10 according to one embodiment of the present invention.

FIG. 5 is a side view of the base of a valve holder according to a preferred embodiment of the present invention. In FIG. 5, the recesses 10 which are utilized have a trapezoidal shape.

Figure 6:
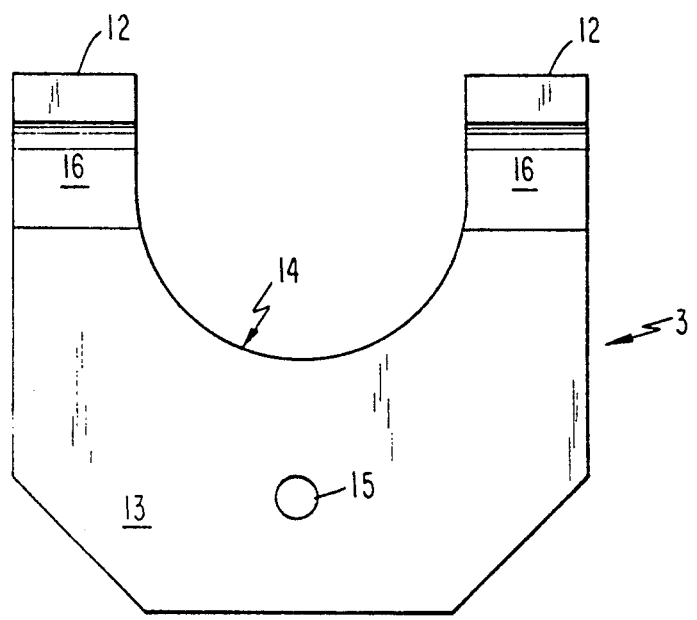
FIG. 6 is a bottom view of a clamp member of a valve holder according to one embodiment of the present invention.

FIG. 6 is a bottom view of a clamp member 3 of a valve holder according to one embodiment of the present invention. The clamp member 3 includes a pair of arm members 12 which extend outwardly from the main body portion 13 of the clamp member 3, and define a recess or gap 14 which separates the pair of arm members 12. The recess or gap 14 which separates the arm members 12 is depicted as having a substantially U-shaped configuration; however, in further embodiments, the recess or gap 14 could be rectangular or V-shaped. As can be best understood from FIG. 1, the shape of the recess or gap 14 must allow for the upper portion of the valve body 15 to pass or extend therethrough.

The main portion 13 of the clamp member 3 includes a through bore 15 through which the thumb screw 3 may pass to secure the clamp member 3 to the base 2 by means of the support block 6 as discussed below.

In the lower surface of the clamp member 3 near the free end of each arm member 12 a recess 16 is provided into which the portions of the valve which extend outward from the valve body 5 are received when the clamp member 3 is fastened to the base 2 with a valve body 5 properly positioned in the chamber 4 (FIG. 1). That is, the recess 16 in each of the arm members 12 is aligned with at least two diametrically opposed recesses 10 formed in the upper portion of the chamber 4, whereby the portions or ports 11 of the valve which extend outward from the valve body 5 may be clamped between the respective recesses in the chamber 4 and clamp member 3 when the clamp member 3 is fastened to the base 2.

Figure 7:
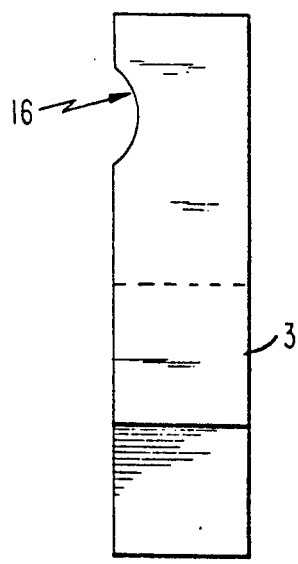
FIG. 7 is a side view of the clamp member of FIG. 6.

FIG. 7 is a side view of the clamp member of FIG. 6. As shown in FIG. 7, the recesses 16 formed in each of the arm members 12 may have a semicircular shape. It is to be understood that, as in the case of the recesses 10 formed in the upper portion of the chamber 4, the recesses 16 formed in the arm members 12 may have a trapezoid shape, i.e., a isosceles trapezoid shape, or otherwise be triangular, rectangular, square, parabola shaped, or any other suitable shape capable of receiving portions or ports 11 of the valve which extend outward from the valve body 5. It is of course necessary that the recesses 16 in the arm members 12 be shallow enough to apply a securing or holding pressure on the portions or ports 11 of the valve which extend from the valve body 5, so as to effect fastening and securing of the valve within the holder assemble.

In operation, the holder assembly is attached by the base 2 to a suitable stable object such as a table or bench top or a wall, by means of the base plate 7 or other support bracket. Next, a valve is positioned in the base 2 so that the body of the valve 5 is received in the chamber 4 and ports 11 of other extensions of the valve are received in recesses 10. Once the valve is positioned in the base 2, the clamp member 3 is positioned with the recesses 16 of the arm members 12 over the ports 11 or other extensions of the valve and clamping is effected by tightening the thumb screw 8. The valve is released from the holder by reversing these steps. The valve may be secured in the holder before or after fluid conduits, e.g., rubber tubes or plastic hoses, are connected to the ports of the valve.

Although the relative dimensions of the elements of the valve holder of the present invention are obviously dependent and easily determined based upon the particular size and configuration of the valve to be secured, the following exemplary dimensions are given to illustrate those dimensions suitable for use in conjunction with a standard laboratory stopcock illustrated in FIG. 1:

Base plate: 3.8 inches by 8.5 inches by 0.25 inch thick.
Support block: 1.25 inches by 1.0 inches by 2.3 inches tall.
Chamber: 1.5 inches O.D. by 1.25 inches I.D. by 2.3 inches tall.
Recesses in chamber: 0.25 inch radius by 0.25 inch deep (semicircular). 0.224 inch deep with a 0.176 inch bottom and 0.286 inch side walls (120° angle from bottom) (trapezoidal).
Clamp: 2.00 inches by 2.125 inches with a 0.625 inch radius U-shaped recess centered 1.625 inches from a side opposite the arm members (arm members: 0.437 inch wide).
Recess in arm members: 0.25 inch radius by 0.1 inch deep (semicircular).

As far as the type of material from which the valve holder can be made, any material which is sufficiently strong, e.g., plastics, metals, ceramics, etc., can be utilized. However, consideration should be given to the environment in which the valve holder is to be utilized. Generally, plastic, e.g., acrylics, materials and resistant metals, e.g., stainless steels, are suitable for most applications inasmuch as these materials are not subject to corrosion.

Although the invention has been described with reference to particular means, materials and embodiments, from the foregoing description, one skilled in the art can easily ascertain the essential characteristics of the present invention and various changes and modifications may be made to adapt the various uses and conditions without departing from the spirit and scope of the present invention as described by the claims which follow.

What is claimed is:

1. A valve holder for releasibly securing a valve having valve port extensions which comprises:
   a support block;
   a chamber member for receiving a valve to be secured by the valve holder, said chamber having a plurality of recesses formed in a top surface thereof for receiving therein valve port extensions of the valve to be supported and for supporting the valve by the valve port extensions, said chamber member being fixed to said support block;
   a clamp member for securing the valve in said chamber member; and
   a mechanical fastener for attaching said clamp member to said support block, said mechanical fastener being securable into said support block so as to enable assembly and disassembly of said valve holder.

2. A valve holder according to claim 1, wherein said plurality of recesses comprise semicircular recesses.

3. A valve holder according to claim 1, wherein said plurality of recesses comprise trapezoidal-shaped recesses.

4. A valve holder according to claim 1, wherein said chamber member comprises a cylindrical chamber.

5. A valve holder according to claim 1, wherein the clamp member comprises a pair of arm members of securing the valve in said chamber member.

6. A valve holder according to claim 5, wherein the arm members include recesses forming one surface thereof for receiving said valve port extensions.

7. A valve holder according to claim 1, further comprising means to attach the valve holder to a support surface.

8. A valve holder according to claim 7, wherein said means to attach comprises a base plate.

9. A valve holder according to claim 1, wherein said mechanical fastener comprises a thumb screw.

10. A valve holder according to claim 1, wherein the number of recesses formed in the top surface of said chamber member is equal to or greater than the number of valve port extensions of the valve to be secured by the holder.

11. A valve holder according to claim 10, wherein the number of recesses formed in the top surface of said chamber member is greater than two.

12. A valve holder according to claim 1, wherein said support block, chamber member, and clamp member are each made from metal.

13. A valve holder according to claim 1, wherein said support block, chamber member, and clamp member are each made from plastic.

14. A method for securing a valve in a valve holder which comprises:
   providing a support block having a chamber member attached thereto for receiving a valve to be secured;
   positioning a valve to be secured in said chamber member so that valve port extensions of said valve are supported in recesses formed in a top surface of said chamber member;
   positioning a clamp member over said valve port extensions which are in said recesses; and
   securing said valve in said chamber by attaching said clamp member to said support block by means of a mechanical fastener which is securable into said support block.

15. A method of securing a valve according to claim 14, further comprising positioning said clamp member so that recesses in a lower surface of said clamp member receive said valve port extensions of said valve.

16. A method of securing a valve according to claim 14, wherein said valve comprises a stopcock valve.

* * * * *